( 12 ) United States Patent
Wen et al.

(10) Patent No.: US 10,122,170 B2
(45) Date of Patent: Nov. 6, 2018

(54) LOAD ADJUSTMENT SHARING SYSTEM AND METHOD

(75) Inventors: Yao-Jung Wen, Albany, CA (US); William Woody Delp, Oakland, CA (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 651 days.

(21) Appl. No.: 14/008,398

(22) PCT Filed: Mar. 22, 2012

(86) PCT No.: PCT/IB2012/051375
§ 371 (c)(1),
(2), (4) Date: Sep. 27, 2013

(87) PCT Pub. No.: WO2012/140529
PCT Pub. Date: Oct. 18, 2012

(65) Prior Publication Data
US 2014/0021787 A1 Jan. 23, 2014

Related U.S. Application Data

(60) Provisional application No. 61/473,930, filed on Apr. 11, 2011.

(51) Int. Cl.
*H02J 3/14* (2006.01)
*H02J 3/00* (2006.01)

(52) U.S. Cl.
CPC ........... *H02J 3/14* (2013.01); *H02J 2003/007* (2013.01); *Y02B 70/3225* (2013.01); *Y02E 60/76* (2013.01);
(Continued)

(58) Field of Classification Search
CPC ...................................... H02J 1/00; H02J 3/14
(Continued)

(56) References Cited

U.S. PATENT DOCUMENTS 5,675,503 A 10/1997 Moe
7,146,258 B2 * 12/2006 Pincu ...................... G06F 1/263
700/297

(Continued)

FOREIGN PATENT DOCUMENTS

EP 2296112 A2 3/2011
JP 2002051463 A 2/2002
(Continued)

*Primary Examiner* — Rexford Barnie
*Assistant Examiner* — Joseph Inge

(57) ABSTRACT

A method (3000) of load adjustment sharing for a space (100) including a first zone (110) and a second zone (120), and a control unit (10) for a load adjustment sharing system (1) are provided. The method comprises the steps of receiving (301) information (130) related to a load adjustment for the space, and receiving (302) environment information (113) about the first zone and environment information (123) about the second zone. Further, based on the environment information about the first zone, the environment information about the second zone and the information related to the load adjustment for the space, a load adjustment share (114) for the first zone and a load adjustment share (124) for the second zone are determined. The present invention may be utilized in buildings including a plurality of zones. The present invention is advantageous in that the load adjustment sharing is intelligently adapted to the environment circumstances in the different zones.

15 Claims, 2 Drawing Sheets

(52) U.S. Cl.
CPC .............. *Y04S 20/222* (2013.01); *Y04S 40/22* (2013.01); *Y10T 307/469* (2015.04)

(58) Field of Classification Search
USPC .......................................................... 307/39
See application file for complete search history.

(56) References Cited

U.S. PATENT DOCUMENTS

| | | | |
|---|---|---|---|
| 2005/0005621 A1* | 1/2005 | Jayadev | ............. G05D 23/1923 62/230 |
| 2011/0060476 A1* | 3/2011 | Iino | .......................... H02J 3/14 700/297 |

FOREIGN PATENT DOCUMENTS

| | | | |
|---|---|---|---|
| JP | 2002176729 A | 6/2002 |
| JP | 2002340029 A | 11/2002 |
| JP | 2002349929 A | 12/2002 |
| JP | 2006074952 A | 3/2006 |
| JP | 2009124846 A | 6/2009 |
| JP | 2009240032 A | 10/2009 |
| WO | 2004036399 A2 | 4/2004 |
| WO | 2011030200 A1 | 3/2011 |

\* cited by examiner

LOAD ADJUSTMENT SHARING SYSTEM AND METHOD

This invention was made with government support under. The government has certain rights in the invention.

The present invention is related to energy management and efficiency. In particular, the present invention relates to a method of load adjustment sharing for a space including a first zone and a second zone, to a control unit for load adjustment sharing in a space including a first zone and a second zone, and to a load adjustment sharing system comprising such a control unit.

Demand response, also known as load shedding, is a strategy to prevent an electricity grid from brownout or blackout during peak demand periods (i.e. time periods when energy usage is remarkably increased) by asking energy users to voluntarily and temporarily reduce their energy usage. Demand response events are typically initiated by utility companies (or power companies) during such peak demand periods.

Energy usage in spaces (typically commercial buildings) can be reduced in case of a demand response event by reducing the overall load in the space. Such reduction can be accomplished by reducing loads such as heating, cooling, ventilation, air-conditioning and illumination in the space. When the demand response event ends, the reduced loads are recovered back to normal levels. Further, a so called bounce back peak demand (a temporary large increase of energy usage) typically occurs when the demand response event ends, as normal indoor conditions are restored.

Load adjustments in spaces can also be made in order to meet peaks in electricity pricing. Electricity prices rise normally during peak demand periods and, thus, it might be desirable to lower the energy consumption in a space during such a period.

In general, such load adjustments are managed by building managers deciding which loads to adjust and how to adjust them, or by energy management and control systems (EMCS). The load adjustments are typically made according to predetermined instructions, evenly across different zones of the space.

According to a first aspect of the present invention, a method of load adjustment sharing for a space including a first zone and a second zone is provided. The method comprises the steps of receiving information related to a load adjustment for the space, and receiving (or obtaining) environment information about the first zone and environment information about the second zone. Further, based on the environment information about the first zone, the environment information about the second zone and the information related to the load adjustment for the space, a load adjustment share for the first zone and a load adjustment share for the second zone are determined.

Further, according to a second aspect of the present invention, a control unit (or a controller) for load adjustment sharing in a space including a first zone and a second zone is provided. The control unit is configured to receive information related to a load adjustment for a space, and receive environment information about the first zone and environment information about the second zone. Further, the control unit is configured to determine a load adjustment share for the first zone and a load adjustment share for the second zone based on the environment information about the first zone, the environment information about the second zone and the information related to the load adjustment for the space.

In the present application, by the term "environment information" it is meant information related to environment conditions in a zone. Further, loads to be adjusted according to the load adjustment shares may be any loads contributing to energy/electricity consumption, such as illumination load, cooling/heating load etc.

The present invention is based on the understanding that different zones in a space will be affected differently by a load adjustment causing an offset in the indoor environment, depending on environment conditions (or factors) in each zone. The environment conditions in a zone may e.g. depend on its location, orientation and use, and may hence differ between different zones and also vary drastically during a day and according to season. Ambient factors such as solar radiation and outdoor temperature, as well as factors inside a zone such as people and equipment, affect the zonal environment. Moreover, occasional modifications such as installation of new illumination systems or change in use of a zone (e.g. from an open office landscape to a storage room), will affect the environment conditions.

Hence, the basic idea of the invention is to dynamically adapt the load adjustment sharing (or adjustment sharing plan) between different zones in a space based on the environment conditions in the zones.

It will be appreciated that the present invention is also applicable to spaces having more than two zones (i.e. several zones). Hence, the load adjustment sharing according to the invention may be performed taking into account load diversity of a plurality of zones and load adjustment shares may be determined for each of the zones based on environment information received from the zones.

The present invention is advantageous in that the load adjustment sharing is intelligently adapted to the environment circumstances in the different zones. Hence, the load adjustment sharing for the space is not predetermined, whereby the adverse impacts of going outside of normal environment conditions are reduced while obtaining a target load adjustment. Accordingly, the present invention is advantageous in that the load adjustment sharing accounts for load diversity in the space. Moreover, the load adjustment for the space can be performed in an energy efficient way and with a reduced impact on the indoor environment. The present invention is further advantageous in that it accounts for environmental changes in the zones, and a load adjustment share for a zone can be individually adapted to the zone in order to reduce the impact of the load adjustment in the zone.

The present invention is further advantageous in that it is suitable for adjustment sharing for spaces having several zones. In prior art techniques, predetermination of adjustment sharing for such spaces may be complex and cumbersome. With the present invention, the load adjustment sharing for spaces having several zones is performed automatically and intelligently, taking into account the load diversity of all (or many of) the zones.

Moreover, the present invention is advantageous in that the load adjustment sharing is performed by a control unit which may be integrated with a present EMCS or a building automation system (BAS).

In the following, embodiments of the present invention are first described with reference to the method of the present invention described above. However, it will be appreciated that these embodiments may equally be combined with the control unit of the present invention described above as well.

According to an embodiment of the present invention, the load adjustment share for a zone may indicate a load reduction share for the zone. The present embodiment may advantageously be used when a load reduction for the space is initiated. Hence, a load reduction sharing being adapted to the environment circumstances in the zones is obtained.

According to an embodiment of the present invention, the information related to the load adjustment for the space may indicate a demanded load reduction associated with a demand response event. The present embodiment is advantageous in that the load adjustment sharing associated with the demand response event is determined with respect to the environment conditions in the zones, thereby improving energy management in case of a demand response event.

According to an embodiment of the present invention, the method may for example further comprise the step of assigning the load adjustment share for a zone to the zone. The load adjustment share for the first zone may be assigned to the first zone, and so on. The present embodiment is advantageous in that it enables to take action in response to the load adjustment sharing, i.e. the load in a zone may be adjusted in accordance with the assigned load adjustment share for the zone.

According to embodiments of the present invention, the environment information about a zone may provide information about current load conditions associated with the zone and/or predicted load conditions associated with the zone. The environment information about the first zone may for example provide information about the current load conditions associated with the first zone and/or predicted load conditions associated with the first zone, and so on. Hence, such dynamic environment information (i.e. current and/or predicted load conditions) of the zones may be utilized to determine the load adjustment sharing for the zones. The present embodiment is advantageous in that, at any given time, the adjustment sharing will be adapted to the environment conditions in the zones.

Further, the environment information about a zone may provide information about one or more of the following: zone type of the zone (i.e. how a zone is utilized, e.g. as a private office, a storage room, a conference area, etc), orientation of the zone and location of the zone, which is advantageous in that such environment information may further contribute to adapt the load adjustment sharing to the different zones.

According to an embodiment of the present invention, the information about current load conditions associated with a zone may include information about load type/types currently used in the zone and amount of load used by the load type/types. Further, the information about predicted load conditions associated with a zone may include information about load type/types predicted to be used in the zone and amount of load predicted to be used by the load type/types. The present embodiment is advantageous in that the load adjustment sharing is more accurately adapted to the load diversity of the zones in the space when taking into account that different zones having different load types will be affected differently by a load adjustment. With the present embodiment, a load adjustment share for a zone with high illumination loads and low heating loads will differ from a load adjustment share for a zone with low illumination loads and high heating loads.

In an embodiment of the present invention, a load to be adjusted according to an adjustment share may relate to one or more of the following: illumination load, cooling load, heating load and ventilation load According to embodiments of the present invention, environment settings in a zone may be determined based on the determined load adjustment share for the zone, which is advantageous in that the environment settings in the zone will be adapted according to the determined load adjustment sharing. The environment settings may then be communicated to the respective zones.

Further, the environment settings may be one or more of the following: temperature settings, illumination settings, humidity settings, shading settings (for windows) and ventilation settings.

According to an embodiment of the present invention, the method may further comprise the step of weighting the zones of the space based on the received environment information. Further, the determining of the load adjustment shares of the zones may be based on the weighting of the zones. The present embodiment is advantageous in that the zones may be weighted based on e.g. how much they would be affected by a load adjustment, whereby zones potentially being highly affected can obtain a lower load adjustment share than zones potentially being less affected, which contributes to a more energy efficient load adjustment sharing with reduced adverse impacts.

In an embodiment of the present invention, the environment information about a zone may indicate a required load recovery for the zone, and the load adjustment share for a zone may indicate a load recovery profile for the zone. The present embodiment is advantageous in that a bounce back peak demand at the end of a load adjustment is reduced and the load recovery profiles are adapted to the environment conditions in the zones. Hence, a blackout can be avoided while restoring the normal environment conditions in the zones.

In an embodiment of the present invention, the information related to the load adjustment for the space comprises information about energy pricing (with respect to time), which is advantageous in that the load adjustment for the space can be utilized to lower energy consumption during peaks in energy pricing, thereby lowering energy costs for the space. Energy pricing may for instance refer to electricity pricing or natural gas pricing.

According to an embodiment of the present invention, a load adjustment sharing system is provided. The load adjustment sharing system may comprise control unit as described in accordance with the second aspect of the invention. The control may advantageously be a supervisory level controller. The load adjustment sharing system may further comprise a zone controller for the first zone configured to send environment information about the first zone to the supervisory level controller, and a zone controller for the second zone configured to send environment information about the second zone to the supervisory level controller.

The present embodiment is advantageous in that the supervisory level controller is a central unit managing the determination of a load adjustment sharing plan for the zones by exploiting local zone controllers to obtain zonal environment information. Hence, the supervisory level controller can consider the environment conditions in the zones when determining the load adjustment sharing plan such that adverse impacts of the load adjustment are reduced.

Still in connection with the last described embodiment, the supervisory level controller may further be configured to assign the load adjustment share for the first zone to the zone controller for the first zone and the load adjustment share for the second zone to the zone controller for the second zone. The zone controller for the first zone may further be configured to determine environment settings for the first zone based on the assigned load adjustment share for the first zone, and the zone controller for the second zone may further be configured to determine environment settings for the second zone based on the assigned load adjustment share for the second zone.

The present embodiment is advantageous in that such a local determination of the environment settings reduces the need of processing power at the supervisory level controller. The environment setting equipment (such as thermostats, illumination systems and shading systems) normally resides in the zones and may advantageously be controlled by the zone controllers.

In an embodiment of the invention, the zone controller for a zone may further be configured to monitor current load conditions and/or to predict load conditions in the zone, which is advantageous in that such environment information contributes to make a successful determination of the load adjustment shares for the zones.

Further objectives of, features of, and advantages with, the present invention will become apparent when studying the following detailed disclosure, the drawings and the appended claims. Those skilled in the art realize that different features of the present invention can be combined to create embodiments other than those described in the following. In particular, it will be appreciated that the various embodiments described for the method are all combinable with the supervisory level controller as defined in accordance with the second aspect of the present invention.

The above, as well as additional features and advantages of the present invention, will be better understood through the following illustrative and non-limiting detailed description of preferred embodiments of the present invention, with reference to the appended drawings, in which.

Figure 1:
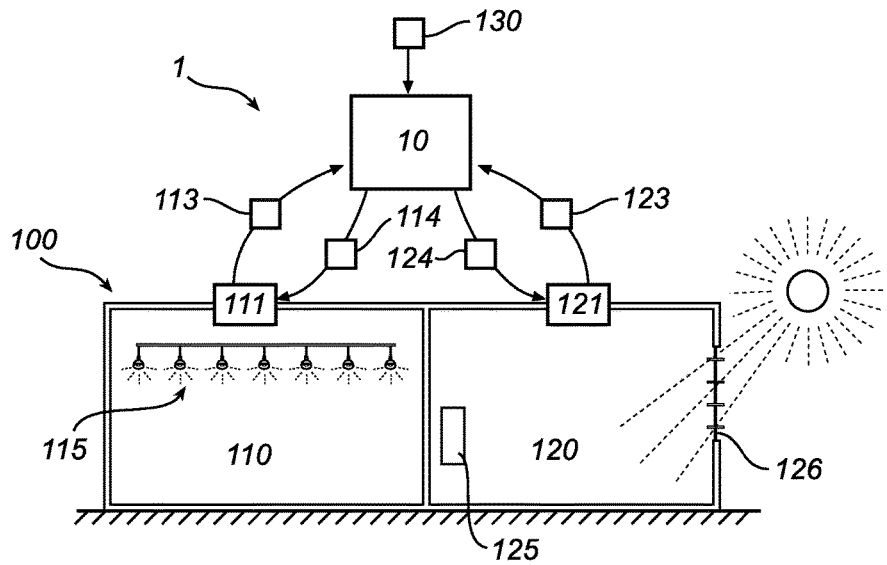
FIG. 1 shows a load adjustment sharing system according to an embodiment of the present invention.

A load adjustment sharing system 1 for a space 100 is shown in FIG. 1. The space 100 may e.g. be a building (as shown in FIG. 1), but also a space of a more open character, such as an amusement park or a music festival. The space comprises a first zone 110 and a second zone 120. The zones 110, 120 may e.g. be two rooms in the building, or two zones housing different entertainment devices in the amusement park. The environment conditions in a zone may, at every time instance, vary drastically depending on e.g. its type, location and orientation. The environment conditions may also vary between different zones. A zone comprising an open-plan office with many occupants, or a zone that receives more solar heat gain will for instance have a substantially higher cooling demand than other zones. Further, a zone comprising an office space may have higher illumination loads than a zone comprising a storage room.

FIG. 1 shows an illustrative simplified example, wherein the first zone 110 has an illumination system 115 requiring a relatively high illumination load to be operated, while the second zone 120 is oriented on the south side of the space 100 and exposed to solar heat gain a great part of the day. For this reason the second zone 120 is equipped with an air-conditioning unit 125 providing sufficient cooling to meet a temperature (thermostat) set point, thereby requiring a relatively high cooling load to be operated, and blinds 126 to shade the sun.

The load adjustment sharing system 1 comprises a supervisory level controller (or a control unit) 10. The supervisory level controller 10 may be integrated with an EMCS or a BAS of the space 100. The supervisory level controller 10 is configured to receive information 130 related to a load adjustment for the space 100. The information 130 may e.g. indicate a demanded load reduction associated with a demand response event and/or comprise information about electricity pricing. Such information 130 may be broadcasted (or sent) by a utility company to participants in a demand response program (i.e. participants whom has agreed to voluntarily and temporarily lower their energy consumption during peak demand periods). Alternatively, load adjustments may be predetermined (e.g. by a building manager) to avoid peak energy pricing.

The load adjustment sharing system 1 further comprises a zone controller 111 for the first zone 110, and a zone controller 121 for the second zone 120. The zone controllers 111, 121 are communicatively connected (e.g. Ethernet based) to the supervisory level controller 10 (and optionally the EMCS) and, optionally, adapted to receive instructions about environment settings in the zones 110, 120 from the supervisory level controller 10 (and/or the EMCS). The zone controller for a zone controls the environment settings in the zone by controlling e.g. thermostat, illumination system and shading system settings. Optionally, the environment settings may be controlled by the zone controller to reduce energy usage and maintain a desired comfort level in the zone by generating optimal settings for electric lighting ballast, blinds and temperature set point in the controlled zone 110, 120 based on information gathered from sensors, including air temperature, mean radiant temperature, humidity, task illuminance (or task lighting), vertical illuminance (or glare) etc. However, in an alternative embodiment of the invention, the supervisory level controller 10 may be configured to control the environment settings in the zones 110, 120 and to generate the optimal settings.

Further, the zone controller for a zone is configured to monitor the current load conditions in the zone and to predict load conditions in the zones. Prediction of illumination loads may e.g. be made by keeping track of the lighting dimming levels and prediction of cooling and heating loads can be performed using analytical approaches, such as the room transfer function method. Such methods take into account solar radiation, outdoor temperature, electric lights, equipment, people, etc., to predict the required heating or cooling load. An example of such room transfer function may be found in R. Parsons, Ed. ASHRAE Handbook—Fundamentals, Atlanta: American Society of Heating, Refrigerating and Air-Conditioning Engineers, 1997.

Figure 2:
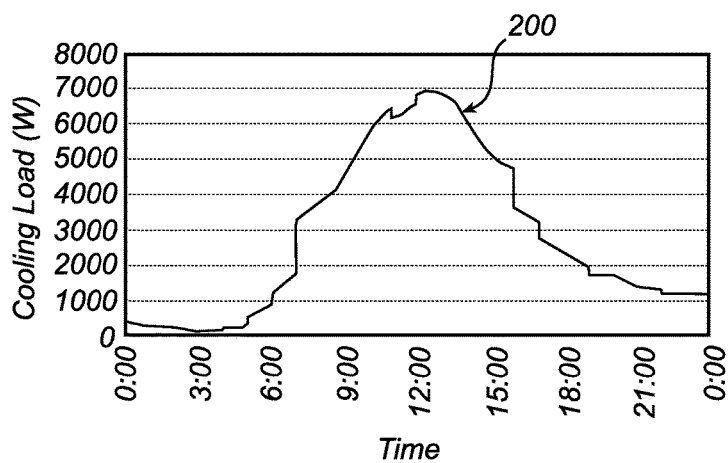
FIG. 2 shows a diagram of a predicted cooling load during a day according to an embodiment of the present invention.

FIG. 2 shows a diagram disclosing an example of a cooling load prediction 200. The vertical axis of the diagram refers to the cooling load, and the horizontal axis refers to the time (24 hours of a day and night). As can be seen, the cooling load 200 is predicted to be substantially higher at noon (about 7000 W) than at midnight when it is predicted to be almost zero.

Turning again back to FIG. 1, the first zone controller 111 is configured to send environment information 113 about the first zone 110 to the supervisory level controller 10, and the second zone controller 121 is configured to send environment information 123 about the second zone 120 to the supervisory level controller 10. The environment information 113, 123 may comprise information about which load type/types are currently used in the zone and what amounts of load are used by those load type/types. The environment information 113, 123 may further comprise information about which load type/types are predicted to be used in the zone and what amounts of load are predicted to be used by those load type/types. Different load types may for instance be illumination load, cooling load, heating load, ventilation load etc., and the amount of a certain load type may e.g. be specified in Watt. However, the environment information may in addition, or as an alternative, comprise information about current and/or predicted temperature, thermostat settings, luminance, humidity, etc. in the zone.

The supervisory level controller 10 is configured to provide a load adjustment sharing (or a load adjustment share plan) once information 130 related to a load adjustment for the space is received. Further, the supervisory level controller 10 is configured to assign a load adjustment share 114 for the first zone 110 to the first zone 110 and a load adjustment share 124 for the second zone 120 to the second zone 120, the load adjustment shares 114, 124 being in accordance with the load adjustment sharing.

Figure 3:
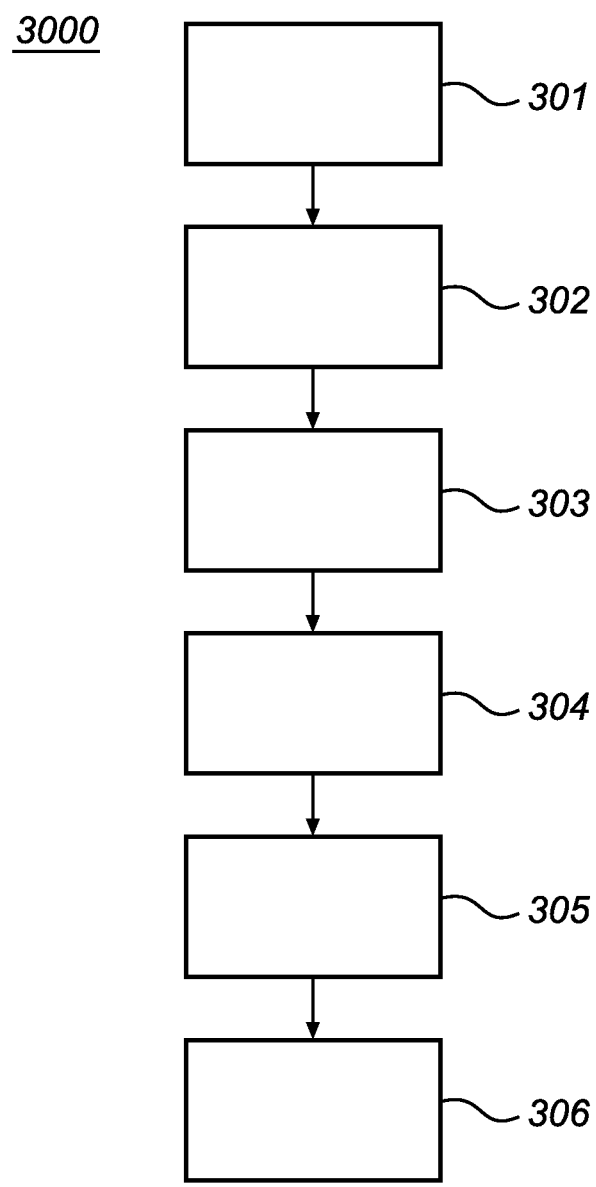
FIG. 3 shows a method of load adjustment sharing according to an embodiment of the present invention.

In the following, a method 3000 of the load adjustment sharing for the space according to an embodiment of the present invention will be described with reference to FIG. 1 and FIG. 3. It will be appreciated that such a method may be implemented in the supervisory level controller 10 described above.

The supervisory level controller 10 receives 301 information 130 related to a load adjustment for the space 100 indicating a demanded load reduction associated with a demand response event. The information 130 may further indicate the extent of the demanded load reduction in terms of amount of load to be reduced and/or the duration the load shall be reduced. The information 130 may for example indicate a demand response event mode as normal, moderate, or high. A high mode event is called upon in anticipation of severe supply shortage in the grid (e.g. on a very hot summer day or a very cold winter day), and the demand response participants need to shed more loads in comparison with normal and moderate events. The information 130 may alternatively indicate a load reduction percentage, such as 20% or 10%.

Further, the supervisory level controller 10 receives 302 environment information about the zones 110, 120. As an example, once the information 130 related to the load adjustment for the space is received, the supervisory level controller 10 may send a request to the zone controllers 111, 121 comprising instructions to provide environment information 113, 123 about the zones 110,120. As an alternative, the zone controllers 111, 121 may continuously provide the supervisory level controller 10 with zonal environment information 113, 123 at predetermined points of time or according to predetermined time intervals. Moreover, a combination of the two alternatives above may be carried out, wherein the zone controllers 111, 121 provide the supervisory level controller 10 with zonal environment information 113, 123 at predetermined time intervals, and the supervisory level controller 10 sends a request once the information 130 related to the load adjustment for the space is received if a (too long) predetermined time period has passed since the supervisory level controller 10 received the last environment information 113, 123 from the zone controllers 111, 121.

According to the illustrative example in FIG. 1, the zone controller 111 for the first zone 110 may send environment information 113 indicating that the type of load predicted to be used in the first zone 110 during the demand response event is illumination load (consumed by the illumination system 115) and that the average amount of illumination load predicted to be consumed during the demand response event is 1000 W. Further, the zone controller 121 for the second zone 120 may send environment information 123 indicating that the type of load predicted to be used during the demand response event is cooling load (consumed by the air-conditioning unit 125) and that the average amount of cooling load predicted to be consumed during the demand response event is 4000 W. It will be appreciated that the present example is simplified and that several different types of load may be used in a zone and consequently indicated in the environment information.

The supervisory level controller may then weight 303 (or prioritize) the zones 110, 120 based on the received environment information 113, 123. The weighting may e.g. be based on how well each zone is anticipated to manage a deviation from normal indoor environment conditions. Illumination for instance, is easy to reduce and restore while thermal conditions (maintained by cooling and heating loads) takes longer time to restore. Further, the weighting may be based on safety requirements or other requirements for the zones. A zone having such requirements may for instance be weighted to take a low or none load adjustment share, and even be allowed to increase the load in the zone if needed.

Further, based on the weighting of the zones 110, 120 (or the environment information 113 about the first zone 110 and the environment information 123 about the second zone 120) and the information 130 related to the load reduction for the space, the supervisory level controller 10 determines 304 a load reduction share plan, i.e. a load reduction share 114 for the first zone 110 and a load reduction share 124 for the second zone 120. Hence, the supervisory level controller 10 divides the target load reduction considering the load diversity of all zones.

According to the example illustrated in FIG. 1, the supervisory level controller 10 may determine that the first zone 110 shall take a larger load reduction share (e.g. 25% load reduction) in comparison with the second zone 120, which may take a smaller load reduction share (e.g. 10% load reduction) in accordance with a weighting of the zones 110, 120, wherein the first zone 110 having high illumination loads which are easy to restore is higher weighted than the second zone 120 having high cooling loads which takes longer time to restore.

When the reduction shares 114, 124 are determined, the supervisory level controller assigns 305 the reduction share 114 for the first zone 110 to the first zone 110 and the reduction share 124 for the second zone 120 to the second zone 120 and sends the reduction shares 114, 124 to the zone controllers 111, 121, respectively.

The zone controllers 111, 121 will then determine environment settings in the controlled zone based on the load reduction shares 114, 124 for the zones 110, 120. Hence, in the present example, the first zone controller 110 will reduce the illumination load of the illumination system 115 with 25% (e.g. by controlling the electric lighting ballast), and the second zone controller 120 will reduce the cooling load of the air conditioning unit 125 with 10% (e.g. by setting a higher target temperature of the thermostat and/or by operating the air-conditioning unit with a lower duty cycle).

In order to reduce a bounce back peak demand when the demand response event is over and the normal environment conditions are restored, the supervisory level controller 10 is configured to make a load recovery plan for the zones, which will be described in the following.

The supervisory level controller receives information indicating that the demand response event is over (or is coming towards its end). Alternatively, this information may be comprised in the information 130 related to the load reduction for the space, which the supervisory level controller 10 has already received. Further, the supervisory level controller 10 receives environment information from the zones 110, 120 once again, e.g. by sending new requests to the zone controllers 111, 121 instructing them to provide zonal environment information. The environment information about the zones 110, 120 may now comprise information indicating a required load recovery for each zone, e.g. anything of the following: current environment conditions and settings (such as current temperature, current illumination load etc.); desired (normal or predicted) environment conditions and settings (in terms of type and amount); and loads required to restore the environment conditions back to desired set points.

Based on the environment information from the zones 110, 120, the supervisory level controller 10 determines load recovery profiles for each zone. A weighting of the zones 110, 120 may be determined by the supervisory level controller 10 in a similar way as the weighting 303 described with reference to the load reduction sharing.

In the illustrative example referred to above, the supervisory level controller 10 may determine a load recovery profile for the second zone 120 according to which the zone controller 121 for the second zone 120 immediately shall begin to restore the desirable thermal environment by gradually increasing the load on the air conditioner (i.e. cooling load). Further, the supervisory level controller 10 may determine a load recovery profile for the first zone 110 according to which the zone controller 111 for the first zone 110 shall restore the illumination loads after a prescribed time period. Hence, the second zone 120 is prioritized to begin to restore the environment conditions before the first zone 110 because the desired zone temperature will take a longer time to restore than the illumination. Moreover, the load recovery profiles may span over different prescribed durations depending on the demand response event mode (normal/moderate/high).

While specific embodiments have been described, the skilled person will understand that various modifications and alterations are conceivable within the scope as defined in the appended claims.

For example, the method according to the invention may be carried out by another device than the supervisory level controller, e.g. by another entity in an EMCS or a BAS for the space.

Further, the environment information about the zones may be obtained by the supervisory level controller itself, instead of (or in addition to) the zone controllers. Likewise, the environment settings in a zone may be determined by the supervisory level controller itself, instead of (or in addition to) the zone controllers.

What is claimed is:

1. A method of load adjustment sharing for a space including a first zone and a second zone, wherein each zone defines a physical area within the space and each physical area includes one or more energy using loads, the method comprising:
    receiving information related to a load adjustment for the space from a service provider or user input;
    receiving environment information from one or more sensors in a respective zone or user input about the first zone and environment information about the second zone;
    determining a load adjustment share for the first zone and a load adjustment share for the second zone based on the environment information about the first zone, the environment information about the second zone and the information related to the load adjustment for the space;
    subsequently receiving information related to a load recovery adjustment for the space from the service provider or user input;
    receiving new environment information from the one or more sensors in a respective zone or user input about the first zone and new environment information about the second zone;
    determining a load recovery adjustment share for the first zone and a load recovery adjustment share for the second zone based on the new environment information about the first zone, the new environment information about the second zone and the information related to the load recovery adjustment for the space;
    wherein the load recovery adjustment share is adapted to restore environmental conditions of each zone to a condition each had prior to the load reduction adjustment.

2. The method as claimed in claim 1, wherein the load adjustment share for a zone indicates a load reduction share for the zone.

3. The method as claimed in claim 1, wherein the information related to the load adjustment for the space indicates a demanded load reduction associated with a demand response event.

4. The method as claimed in claim 1, further comprising assigning the load adjustment share for a zone to the zone.

5. The method as claimed in claim 1, wherein the environment information about a zone provides information about one or more of the following: zone type of the zone, orientation of the zone, location of the zone; and information about load conditions, wherein the information about load conditions is selected from the group consisting of current load conditions associated with the zone, predicted load conditions associated with the zone, and combinations thereof.

6. The method as claimed in claim 5, wherein:
    the information about current load conditions associated with a zone includes information about load type/types currently used in the zone and amount of load used by the load type/types; and
    the information about predicted load conditions associated with a zone includes information about load type/types predicted to be used in the zone and amount of load predicted to be used by the load type/types.

7. The method as claimed in claim 1, wherein a load to be adjusted according to an adjustment share relates to one or more of the following: illumination load, cooling load, heating load and ventilation load.

8. The method as claimed in claim 1, further comprising determining environment settings in a zone based on the determined load adjustment share for the zone.

9. The method as claimed in claim 1, further comprising weighting the zones of the space based on the received environment information about the zones, wherein the determining of the load adjustment shares of the zones is based on the weighting of the zones.

10. The method as claimed in claim 1, wherein:
    the environment information about a zone indicates a required load recovery for the zone, and the load adjustment share for a zone indicates a load recovery profile for the zone.

11. The method as claimed in claim 1, wherein the information related to the load adjustment for the space comprises information about energy pricing.

12. A control unit for load adjustment sharing in a space having a first zone and a second zone, wherein each zone defines a physical area within the space and each physical area includes one or more energy using loads, the control unit being configured to:
- receive information related to a load adjustment for the space from a service provider or user input;
- receive environment information about the first zone and environment information about the second zone from one or more sensors in a respective zone or user input;
- determine a load adjustment share for the first zone and a load adjustment share for the second zone based on the environment information about the first zone, the environment information about the second zone and the information related to the load adjustment for the space;
- subsequently receive information related to a load recovery adjustment for the space from the service provider or user input;
- receive new environment information from the one or more sensors in a respective zone or user input about the first zone and new environment information about the second zone;
- determine a load recovery adjustment share for the first zone and a load recovery adjustment share for the second zone based on the new environment information about the first zone, the new environment information about the second zone and the information related to the load recovery adjustment for the space;
- wherein the load recovery adjustment share is adapted to restore environmental conditions of each zone to a condition each had prior to the load reduction adjustment.

13. A load adjustment sharing system comprising:

a control unit as defined in claim 12;

a first zone controller for the first zone configured to send environment information about the first zone to the control unit; and a second zone controller for the second zone configured to send environment information about the second zone to the control unit.

14. The load adjustment sharing system as claimed in claim 13, wherein:
- the control unit is further configured to assign the load adjustment share for the first zone to the zone controller for the first zone and the load adjustment share for the second zone to the zone controller for the second zone;
- the zone controller for the first zone is further configured to determine environment settings for the first zone based on the assigned load adjustment share for the first zone; and
- the zone controller for the second zone is further configured to determine environment settings for the second zone based on the assigned load adjustment share for the second zone.

15. The load adjustment sharing system as claimed in claim 13, wherein the zone controller for a zone is further configured to monitor current load conditions and/or to predict load conditions in the zone.

* * * * *